Oct. 20, 1953   V. A. TAUSCHER ET AL   2,655,939
SOLENOID HYDRAULIC CONTROL VALVE
Filed Nov. 22, 1948   2 Sheets-Sheet 1

V. A. TAUSCHER
W. D. MULLINS, JR.
K. R. JACKSON
W. D. LYON
INVENTORS.

BY William R. Lane
ATTORNEY

Patented Oct. 20, 1953

2,655,939

UNITED STATES PATENT OFFICE 2,655,939

SOLENOID HYDRAULIC CONTROL VALVE

Vernon A. Tauscher and William D. Mullins, Jr., Los Angeles, Kenneth R. Jackson, Alhambra, and William De Witt Lyon, Los Angeles, Calif., assignors to North American Aviation, Inc.

Application November 22, 1948, Serial No. 61,482

9 Claims. (Cl. 137—623)

This invention pertains to the control of the flow of fluid at high pressure.

It particularly concerns the controlling of the flow of high pressure fluid in servo systems where the required speed of response of the control is very high.

In the past, it has been found in the design of auto-pilot and other servomechanisms that it was difficult to obtain a valve sufficiently fast to satisfy the requirements of high speed servo design. The problem has been particularly acute in hydraulic servo systems where high pressure fluid is used as a means for actuating remotely controlled mechanisms. The difficulty encountered has been that any valve large enough to control an effective flow of fluid in a short time was so large that its inertia forces were too great to be handled conveniently by any ordinary valve actuating means.

It is therefore an object of this invention to provide a means for controlling the flow of hydraulic fluid quickly with a relatively small actuating force.

It is a further object of this invention to provide a means for controlling the flow of hydraulic fluid with a relatively small motion being required of the actuating mechanism, and to provide the actuating mechanism for this purpose.

Another object of this invention is to provide a means for controlling the flow of fluid in conduits maintained at high pressure with a very small time lag between control and response.

A further object of this invention is to provide a high speed valve for controlling the flow of hydraulic fluid in a servo system.

A further object of this invention is to provide a fluid control valve with a pilot valve having minimal inertia forces.

Still a further object of this invention is to provide a hydraulic means for amplifying forces.

Other objects of invention will become apparent from the following description taken in connection with the accompanying drawings, in which—

Figure 1:
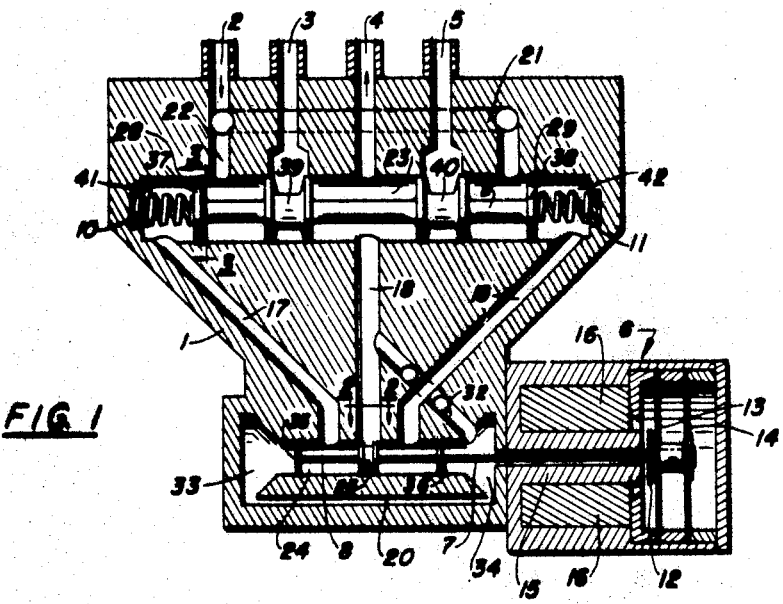
Fig. 1 is a sectional view of one embodiment of the invention.

Referring to Fig. 1 there is shown a valve block 1 having an inlet port 2, an outlet port 4, and two cylinder actuating ports 3 and 5 adapted to be connected to the opposite sides of a double-acting hydraulic actuating cylinder (not shown). A cylinder actuating port will be understood in this specification to mean a port whose principal function is to carry fluid to or from some external device upon which the fluid does work. Associated with the valve block are solenoid 6, driving rod 7, and pilot valve 8 having a center lobe 25 and end lobes 35 and 36. Within the valve block are slave valve 9 and centering springs 10 and 11.

Solenoid 6 comprises driving slug 12 attached to driving rod 7, diaphragm springs 13 and 14, core 15, and winding 16.

Within valve block 1 are fluid flow channels 17, 18, 19, 20, 21, 22, and 32. Slave valve 9 fits within valve recess 23 in valve block 1, and pilot valve 8 fits within pilot valve recess 24 in valve block 1. Slave valve 9 comprises control lobes 39 and 40 and end lobes 37 and 38 having identical fluid openings comprising restrictions 28 and 29. In this specification and accompanying claims lobes are defined as small masses generally so shaped as to be slidable in a cylinder and specifically so shaped as to be slidable in the valve recess with which they are associated and to fit said recess intimately. Slave valve end chambers 41 and 42 accommodate centering springs 10 and 11. Also within valve block 1 are pilot valve end chambers 33 and 34.

Figure 2:
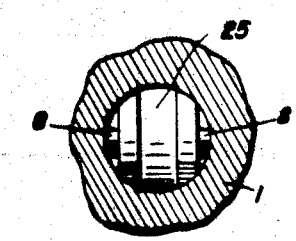
Fig. 2 is an enlarged sectional view taken at 2—2 in Fig. 1.

In the operation of this valve, high pressure fluid is supplied to the valve block through inlet port 2. If the valve is in closed position fluid flows at a small but uniform rate through fluid flow channels 21 and 22, and through small restrictions 28 and 29 formed by slave valve recess 23 and slots in end lobes 37 and 38 of slave valve 9. Thence, the fluid flows along either side of valve block 1 through fluid flow channels 17 and 19 and into pilot valve recess 24. If the valve is closed, fluid flows from pilot valve recess 24 into fluid flow channel 18, bypassing pilot valve center lobe 25 and out port 4, as indicated by the arrows in Fig. 5 and by the open spaces beside center lobe 25 shown in Fig. 2. The fluid is carried from outlet port 4 to a hydraulic pump (not shown) which returns the fluid under pressure to inlet port 2.

Figure 6:
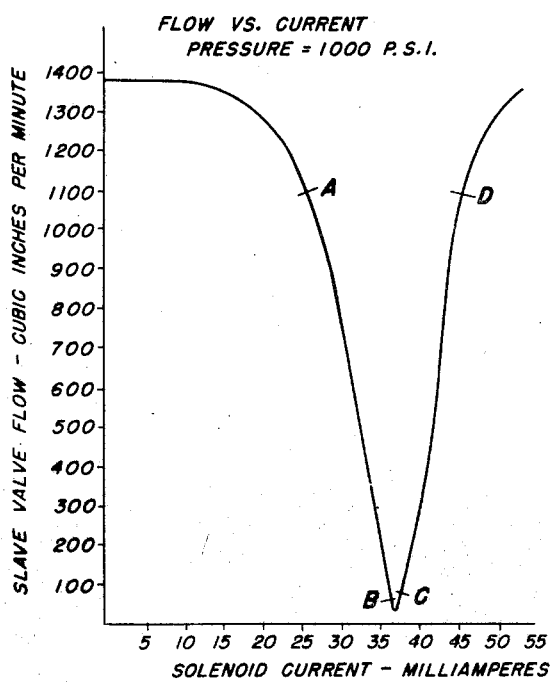
Fig. 6 is a graph of the performance characteristics of this invention.

To open the valve an increase of electric current is caused to flow in coil 16 of solenoid 6, causing movement of driving slug 12 and driving rod 7 attached to pilot valve 8. Longitudinal movement of the pilot valve displaces center lobe 25 so that the flows from each side of the center lobe are no longer equal. Indeed, any substantial movement causes an almost complete stoppage of flow from one side or the other. The result of this movement is that while the pressure on one side of the slave valve decreases, the pressure on the other side builds up rapidly due to the stoppage or retardation of flow. This difference in pressure is instantly communicated through slave valve end chambers 41 and 42 to end lobes 37 and 38 of slave valve 9 which act as hydraulic pistons. The slave valve, which is held in center position by the equal forces of centering springs 10 and 11, therefore moves away from the side having the greater fluid pressure and toward the side having the decreased fluid pressure. Movement of slave valve 9 causes the opening of ports 3 and 5 and, depending on the direction of the movement, port 3 or 5 is supplied with the high pressure fluid. If port 3 is supplied with pressure, port 5 acts as a return to complete the external fluid circuit. The fluid collecting in port 5 then leaves the valve block via port 4. Since the movement of slave valve 9 is proportional to the spring constants of centering springs 10 and 11, it is clear that the flow through slave valve 9 from port 2 to port 3, and from port 5 to port 4, is proportional to the differential pressure acting on the ends of slave valve 9 caused by the movement of pilot valve 8. Diaphragm springs 13 and 14 in solenoid 6 are so constructed that their combination with the change in magnetic flux density produced by the movement of driving slug 12 and the square law of force vs. current is essentially compensated for, the springs having a spring constant which increases as the deflection increases. The result is that the displacement of pilot valve center lobe 25 is made approximately proportional to the current in the solenoid coil 16. It is therefore possible to control the flow of fluid through the slave valve to be a function of the current in solenoid coils 16 because the flow of fluid through the slave valve is approximately proportional to the differential flow through the pilot valve. The extent and range of this proportionality is shown graphically in Fig. 6 by a curve showing valve flow plotted against solenoid current for a typical valve constructed according to this invention. The range of appropriate proportionality is shown to exist between points A and B and between points C and D in Fig. 6. It can therefore be seen that this valve combines the qualities of speedy performance and excellent linearity between the limits indicated—a result which has not heretofore been achieved in any previously known valve.

Fluid flow channel 20 serves to communicate end chambers 33 and 34 of pilot valve 8 so that when the pilot valve itself moves, the fluid in end chambers 33 and 34 will not be compressed and hence will not offer any impedance to the movement of the pilot valve. Since pilot valve end lobes 35 and 36 do not exactly fit the walls of pilot valve recess 24, some leakage past said end lobes must be allowed for. Therefore, fluid flow channel 32 is provided connecting end chambers 34 with fluid flow channel 18 which communicates with fluid outlet port 4 as hereinbefore described. Thus, any leakage past end lobes 35 and 36 is drawn back to outlet port 4 and is recirculated through the external pressure supply pump. The advantage of this feature is that pilot valve end chambers 33 and 34 are maintained at very low pressure in comparison to the pressure in fluid flow channels 21 and 22. No appreciable amount of packing is therefore required around driving rod 7 where it enters solenoid 6, thus eliminating another possible source of friction on the pilot valve.

Figure 4:
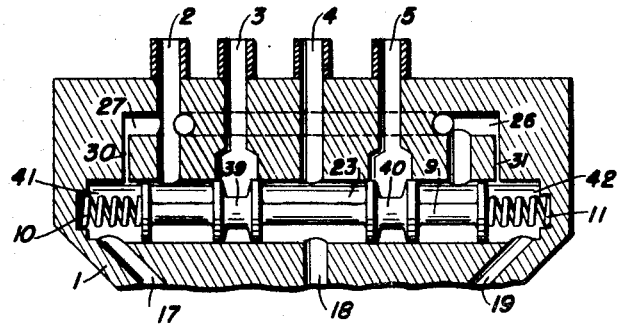
Fig. 4 is a partial section of a modified embodiment of the invention.

It is apparent from a study of the principle of operation of this valve that small restrictions 28 and 29 formed by end lobes 37 and 38 of slave valve 9 could equally well be accomplished by a separate bypass channel in the valve block itself. An arrangement of this nature is shown in Fig. 4 where restrictive bypass channels 26 and 27 bleed from fluid flow channels 21 and 22 into valve end chambers 41 and 42. Thus, the broadest concept of this invention comprises two fluid flow channels 21 and 22 branching in parallel from a common pressure source. In the two parallel channels 21 and 22 are restrictions 30 and 31 (or 26 and 27) which serve to meter the flow through the two parallel channels and to reduce the pressure in the channels when fluid is flowing through them. But of course when fluid is not flowing in the channels the pressure in the channels is the same as that from the common pressure source since the reduction in pressure is caused mainly by loss of kinetic energy of the fluid in the restriction, and the fluid cannot lose kinetic energy when it is stationary. Therefore, if the rates of flow in the two channels are controlled by small pilot valve 8 at the juncture of the two channels, a differential pressure in the two channels can be produced. Now, if the pressures from the two channels are communicated to the ends of a centered slide valve, such as slave valve 9, the valve can be effectively actuated by movement of pilot valve 8. Furthermore, the increment of pressure available for moving the slave valve varies approximately as the square of the velocity produced in the two channels because velocity head is given by the formula $$H = \frac{V^2}{2g}$$

Where H is the velocity head, V is the fluid velocity and $g$ is the acceleration due to gravity. Therefore, a small change in velocity produces a relatively large force for movement of the slave valve. By the same token, a small displacement of the pilot valve produces a large force on the slave valve, thus facilitating speedy response of the valve. This characteristic of the valve is shown graphically in Fig. 6 where it is indicated that a small variation in solenoid current produces a relatively large flow through the slave valve.

Figure 5:
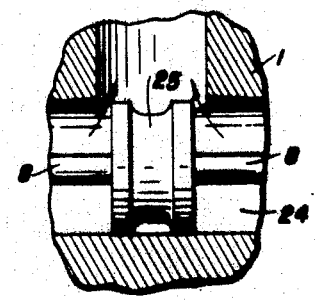
Fig. 5 is an enlarged view of the pilot valve center lobe to be further described hereinafter.
Figure 3:
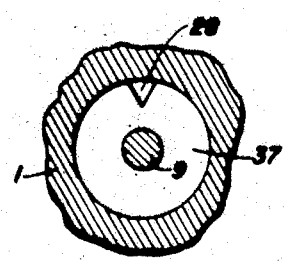
Fig. 3 is an enlarged view taken at 3—3 in Fig. 1.

This valve is designed for use in servo systems where the time of response between the actuating signal and movement of the actuated mechanism must be at a minimum. It has been found that a valve constructed essentially as described is capable of passing a flow at 1000 pounds per square inch supply pressure of approximately 1000 cubic inches per minute within .01 second from the time the signal is applied to the solenoid. This valve has the added advantage that the fluid pressure may be applied either at intake port 2, as hereinbefore described, or at outgoing port 4. If the fluid pressure is applied at port 4, port 2 becomes the outgoing port and actuation of external hydraulically operated devices connected to ports 3 and 5 is reversed. It is to be noted that in either case there is a constant small flow through the pilot valve whether the slave valve is open or closed, as is shown in Fig. 5.

Any solenoid or other actuating means may be used to drive driving rod 7, satisfactory results having been obtained with a dynamic speaker voice coil type of driver and with the type of solenoid driver described herein. Any device in which the movement produced is a predictable function of the signal applied and the natural frequency is sufficiently high to allow operation with acceptably low time lags can be used.

This device also functions as a hydraulic amplifier in that a small force applied through a small distance at the pilot valve may be used to produce a predeterminately larger force acting through a larger distance at the slave valve. This function is similar in nature to that performed by the electronic vacuum tube.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A valve comprising a valve block, a cylindrical chamber in said valve block having inlet, outlet, and actuating ports for receiving and supplying hydraulic fluid from and to external hydraulic machinery to be actuated, a piston centrally located to freely slide in said chamber, said piston being equipped with lobes positioned to cover said actuating ports when said piston is centered in said chamber, restricted fluid channels for conducting fluid from said inlet port to the ends of said piston, and from the ends of said piston to a junction with said outlet port, a slidable pilot valve with a single central lobe positioned over but not completely covering said junction to control the relative amount of fluid flowing from each of said restricted fluid channels into said actuating ports thereby controlling the flow of liquid from said inlet port through said chamber and out said outlet and actuating ports.

2. A regulating valve comprising a housing, an inlet port, an outlet port, two cylinder-actuating ports, a light-weight slidable pilot valve having two end lobes and a center lobe, a slidable slave valve having two end lobes and two control lobes positioned to cover said cylinder-actuating ports, a chamber for accommodating said slave valve, a chamber for accommodating said pilot valve, fluid channels adapted to carry fluid from said inlet port to the spaces between said slave valve end lobes and said slave valve control lobes, end chambers at the ends of said slave valve, fluid channels adapted to carry fluid from said end chambers to the space between said pilot valve end lobes and said pilot valve center lobe, end chambers at the ends of said pilot valve, a fluid channel between said pilot valve end chambers, a fluid channel somewhat larger than said pilot valve center lobe so positioned as to be concentric with said pilot valve center lobe when said pilot valve is in centered position in said pilot valve chamber and connecting said pilot valve chamber to the space between said slave valve control lobes and to said fluid outlet port, slots in said slave valve end lobes for admitting fluid into said slave valve end chambers and thence to said pilot valve chamber at a reduced rate, whereby sliding movement of said pilot valve causes sliding movement of said slave valve to thereby communicate one of said cylinder-actuating ports with said inlet port and the other of said cylinder-actuating ports with said outlet port.

3. A device as recited in claim 2 and further comprising means for producing movement of said pilot valve proportional to the magnitude of a predetermined electric current whereby the volume of fluid passing through said slave valve from said pressure port to one of said cylinder actuating ports is proportional to said electric current.

4. Regulating means comprising a plurality of fluid channels arranged in parallel, means for causing the flow of fluid into said plurality of channels from a common source, means for restricting the flow in said plurality of channels, a single channel, a T-shaped junction for recombining the flow in said plurality of channels into said single channel, said plurality of channels being connected to the arms of said T-shaped junction and said single channel being connected to the upright of said T-shaped junction and slide valve means movable in the arms of said T-shaped junction and centered over said T-shaped junction for controlling the rate of flow from each of said plurality of channels into said single channel, thereby to regulate the differential pressure in said plurality of channels in response to motion of said slide valve.

5. A device as recited in claim 4 in which said slide valve means comprises a pilot valve having a central lobe centered over said single channel and end lobes in each of the arms of said T-shaped junction outboard from the connection to said plurality of channels, a separate fluid flow channel for connecting the ends of said T-shaped junction and a linear electro-magnetic actuator adapted to drive said pilot valve lobe so that said differential pressure is proportional to the current in said actuator and the forces on said pilot valve are independent of said differential pressure.

6. A device as recited in claim 4 and further comprising means responsive to said differential pressure for regulating the flow of fluid in a hydraulic system whereby said flow of fluid is proportional to the movement of said slide valve rate controlling means.

7. A device as recited in claim 4 in which said plurality of channels comprises two channels, and in which said slide valve means comprises a movable mass for selectively blocking flow from either of said two channels into said single channel and piston means rigidly connected to said mass and responsive to pressure in said two channels for balancing forces from said two channels upon said mass, said mass being too small to prevent completely said flow from both of said two channels, and means for moving said movable mass thereby to regulate the pressure differential between said two channels in proportion to the position of said moving means.

8. A regulating valve comprising a housing having an inlet port to receive fluid under pressure, an outlet port and two actuating ports for receiving and supplying hydraulic fluid to and from external hydraulic machinery to be actuated, a cylindrical chamber within said housing connected at its center point to said inlet port and near its ends to said outlet port and near its quarter points to said actuating ports, a cylindrical slidable slave valve adapted to slide in said cylindrical chamber and having end lobes outboard of the connection of said outlet port to said chamber and two centrally disposed lobes adapted to cover the intersections of said actuating ports with said chamber, a pilot valve having two end lobes and one centrally disposed lobe, a chamber adapted to accommodate said pilot valve, said chamber being connected to said inlet port opposite said center lobe, fluid channels connected to conduct fluid from the spaces between the center and end lobes of said pilot valve to the space outboard in said slave valve chamber from said slave valve end lobes, a fluid channel connecting the spaces outboard from the end lobes of said pilot valve, and means for moving said pilot valve to thereby cause a differential of pressure upon the end lobes of said slave valve sufficient to move said slave valve without imposing appreciable force upon said pilot valve due to said differential pressure.

9. Regulating means comprising a pair of fluid channels arranged in parallel, means for causing the flow of fluid into said pair of channels from a common source, means for restricting the flow of fluid into said pair of channels, a single channel, a T-shaped junction for recombining the flow of fluid in said pair of channels into said single channel, said pair of channels being connected to the arms of said T-shaped junction and said single channel being connected to the upright of said T-shaped junction, slide valve means movable in the arms of said T-shaped junction and centered on said T-shaped junction for controlling the rate of flow from each of said pair of channels into said single channel, and means responsive to the differential pressure in said pair of channels for regulating the flow of fluid in a hydraulic system whereby said flow of fluid is proportional to the movement of said slide valve rate controlling means.

VERNON A. TAUSCHER.
    WILLIAM D. MULLINS, Jr.
    KENNETH R. JACKSON.
    WILLIAM D. LYON.

References Cited in the file of this patent

UNITED STATES PATENTS

| Number | Name | Date |
|---|---|---|
| 2,020,847 | Mitereff | Nov. 12, 1935 |
| 2,357,986 | Wichterman | Sept. 12, 1944 |
| 2,391,930 | Stone | Jan. 1, 1946 |

FOREIGN PATENTS

| Number | Country | Date |
|---|---|---|
| 473,018 | France | of 1914 |
| 801,509 | France | of 1937 |